Figure 3:
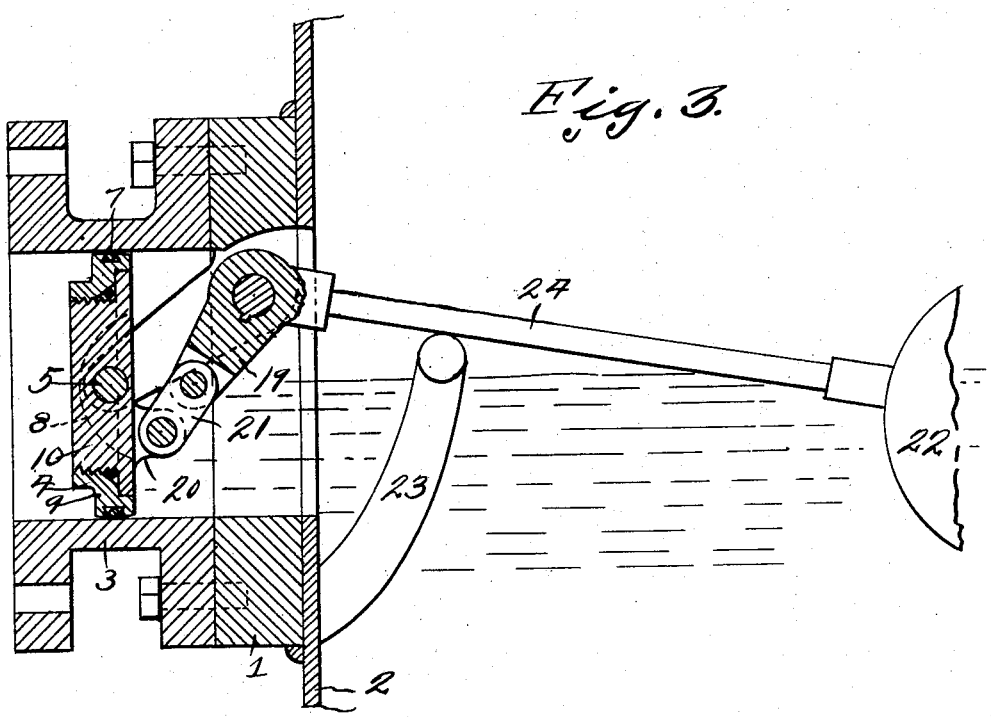

Feb. 17, 1959 P. B. DRANE 2,873,942
VALVE AND ACTUATING MEANS
Filed April 2, 1958 3 Sheets-Sheet 1
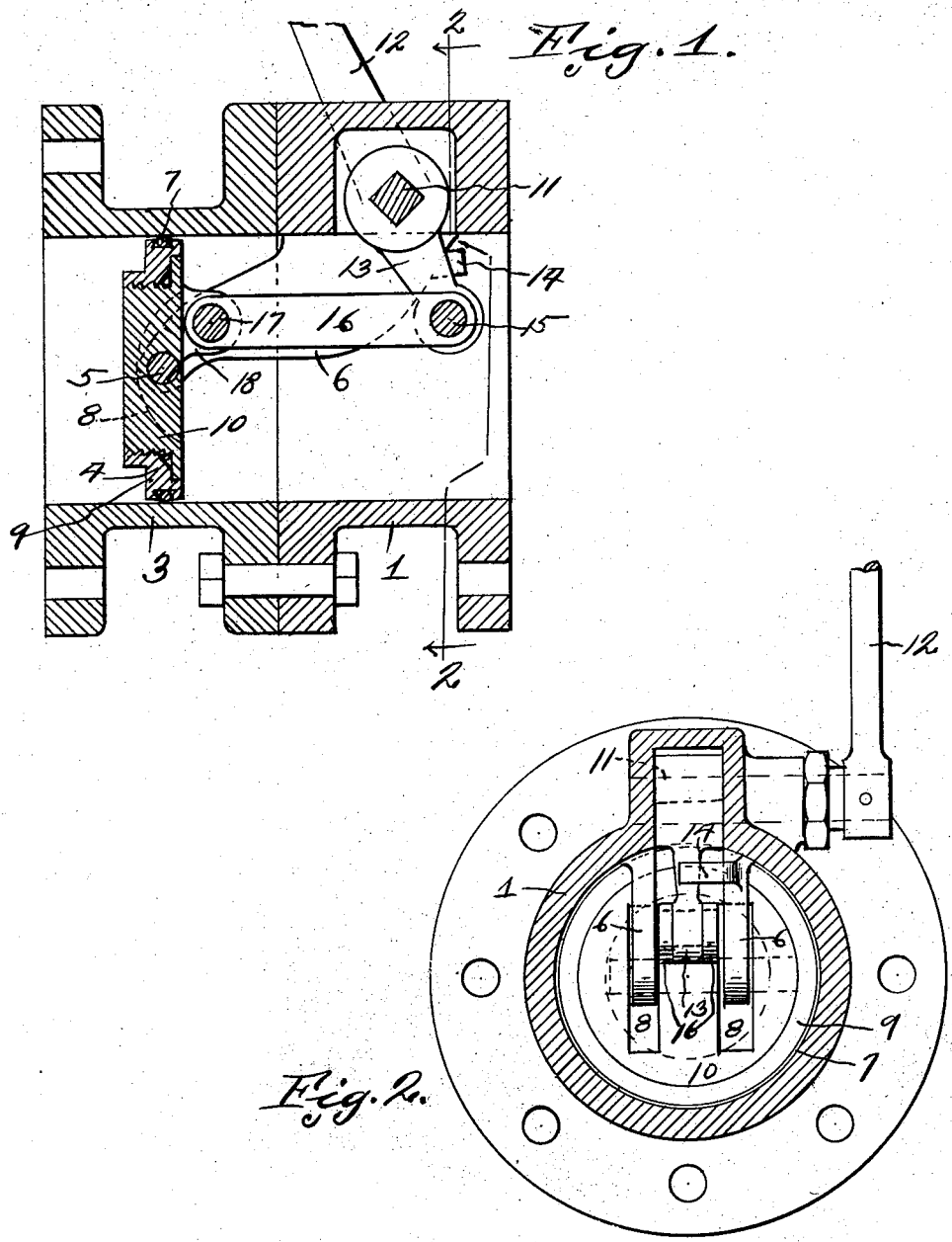
INVENTOR.
Phillips B. Drane Feb. 17, 1959 P. B. DRANE 2,873,942
VALVE AND ACTUATING MEANS
Filed April 2, 1958 3 Sheets-Sheet 2

INVENTOR.
Phillips B. Drane

Feb. 17, 1959     P. B. DRANE     2,873,942
VALVE AND ACTUATING MEANS

Filed April 2, 1958     3 Sheets-Sheet 3

INVENTOR.
Phillips B. Drane

United States Patent Office 2,873,942
Patented Feb. 17, 1959

2,873,942

VALVE AND ACTUATING MEANS

Phillips Brooks Drane, Tulsa, Okla.

Application April 2, 1958, Serial No. 727,516

7 Claims. (Cl. 251—151)

This invention relates to butterfly valves, of a large size and particularly adapted for use in large pipe lines and in connection with separators, and has for its object to provide a device of this kind wherein the valve is tilted to and from a closed position by a gear, lever or float mechanism according to place of use.

A further object is to rockably mount the butterfly valve on a bracket carried by a pipe line insert, and to extend the bracket outwardly from the insert chamber to one side of the insert member so that the valve is positioned in an adjacent part of the pipe line.

A further object is to tilt the valve by a link connection between an arm carried by a rockshaft and the valve.

A further object is to place the pivotal connection between the valve supporting bracket and the valve at a point spaced inwardly from the periphery of the valve and preferably within recesses of the valve.

A further object of the invention resides in providing a valve having a gear segment in mesh with an operating gear mounted in the pipe line insert for tilting the valve to and from a closed position.

Other objects and advantages of the invention will be apparent during the course of the following description.

Figure 4:
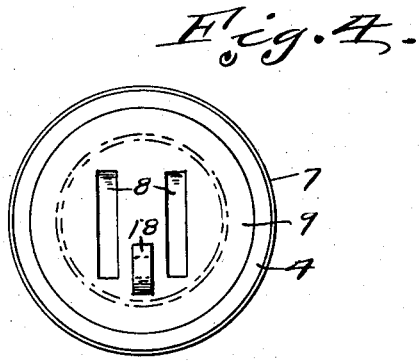
Figure 5:
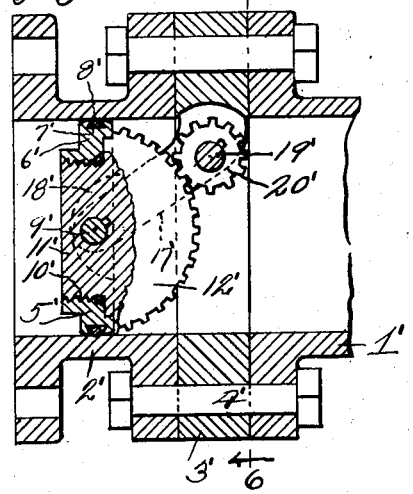
Figure 6:
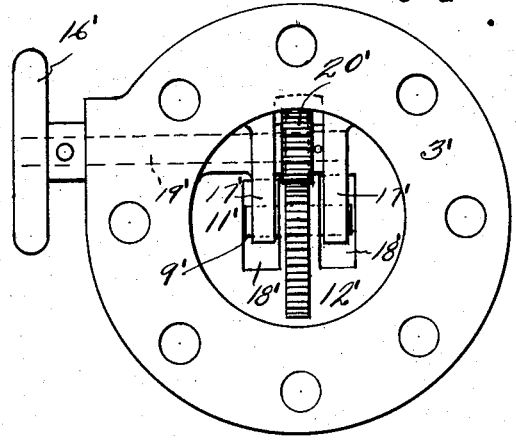
Figure 7:
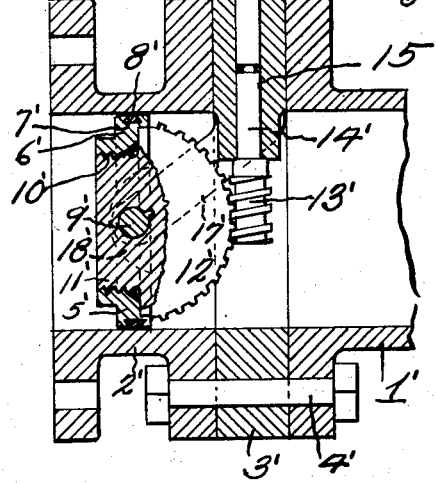
Figure 8:
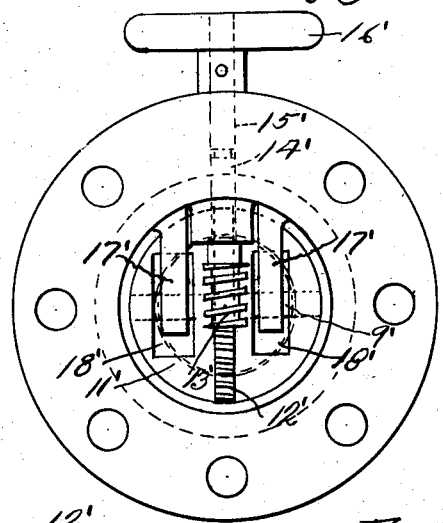
Figure 9:
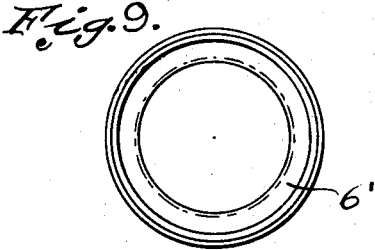
Figure 10:
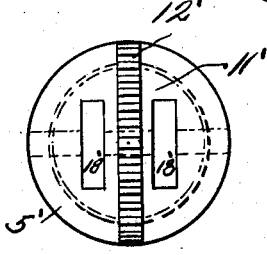
Figure 11:
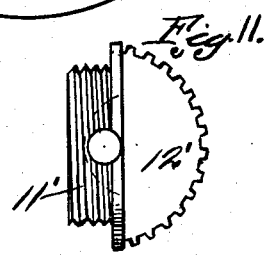

In the drawings:

Figure 1 is a vertical longitudinal view through the valve, showing the same in closed position, Figure 2 is a vertical transverse sectional view taken on line 2—2 of Figure 1, Figure 3 is a view similar to Figure 1, but showing a modified lever structure, particularly adapted for use where a float operating means is desired, Figure 4 is an end view of the butterfly valve, Figure 5 is a vertical longitudinal view through the valve showing a modified form of actuating means, Figure 6 is an end elevation of the valve looking in the direction of the arrows Figure 5, Figure 7 is a view similar to Figure 5 showing a worm gear for operating the gear segment, Figure 8 is an end elevation of the valve shown in Figure 7, Figure 9 is a view in elevation of the outer ring of the butterfly valve, Figure 10 is a view in end elevation of the valve insert member showing the gear segment carried thereby, and, Figure 11 is a side elevation of the gear segment showing the threaded portion thereof.

Referring to the drawings, the numeral 1 designates an insert casing which casing may be inserted in a pipe line, which may be attached to a separator 2 as shown in Figure 3 or placed anywhere desired, the above use being illustrative only.

Referring to the form shown in Figures 1 and 2, a second insert casing 3 is connected to insert casing 2 and to one side thereof and in which second casing the butterfly valve 4 rocks on its pivot pin 5. Pivot pin 5 has its ends rockably mounted in bearings of supporting arms 6 formed integral with the inner periphery of the casing 1. Arms 6 extend towards the axis of the casings and terminate in the second insert casing, so that the ring gasket 7, carried by the periphery of the butterfly valve, can seal against the inner periphery of the second casing as clearly shown in Figure 1. It will be noted that one side of the valve is provided with spaced recesses 8 so that the pivotal point of the valve will be in the plane of the ring gasket for insuring a proper compressing of the ring gasket when the valve is closed. Valve 4 comprises an outer gasket carrying ring 9, in which a threaded insert member 10 is threaded, the valve is supported by the arms 6 as near as possible to the center of the valve for positive operation at all times without binding.

Rockably mounted transversely of the casing 1, at the upper side thereof is a rockshaft 11 and this shaft is rocked by a hand lever 12 on the outside of the casing, it being understood that means, other than a lever may be used as desired. Shaft 11 is provided with an arm 13 extending into the chamber of the insert casing 1 and the arm is limited in its movement, in one direction by a stop lug 14 carried by one of the arms 6. Pivotally connected to the end of the arm 13, at 15 is a link 16. The other end of the link 16 being pivotally connected at 17 to a lug 18 carried by one side of the valve. It will be seen that by rocking the lever 12 in either direction the valve can be moved to open or closed position as desired.

Referring to Figure 3 the valve supporting means is substantially the same as in the first form, with the arm 19 connected to the lug 20 of the valve by a short link 21 instead of a long one and the arm 19 is controlled by a float 22 within the separator 2 or any other tank. A limit arm 23 is preferably provided in the tank in the path of the float arm for limiting the valve to closed position. Otherwise the same numerals apply to the float form of the invention.

Referring to Figs. 5 to 11 of the drawings wherein other forms of the invention are shown the numeral 1' indicates a flanged pipe end which may be in a pipe line, or part of a fitting attached to a separator. At the present time very expensive valves are used in pipe lines, particularly of the type used in oil fields and on account of these valves requires very little machine work and hence can be deal of machine work. The present construction of valves require very little machine work and hence can be cheaply manufactured and sold, as there are no valve seats involved and the inner periphery of the pipe is utilized as a seat. Interposed between the pipe end 1' and the flanged insert fitting 2' is a valve carrying member 3'. All of these parts are bolted together by means of bolts 4'. Member 3' carries and supports all of the valve mechanism, even though the disc valve 5' is offset to one side thereof and tiltably seats against the inner periphery of the insert fitting 2' as shown in Figures 5 and 7. Disc valve 5' comprises an outer gasket carrying ring 6', having a peripheral gasket groove 7', in which is disposed a gasket ring 8' which compressibly seals against the inner periphery of the insert fitting 2' as clearly shown in Figures 5 and 7. Disc valve 5' rotates, or tilts on the pivot pin 9' when it is moved from closed to open position and the axis of the pin extends across the axis of the insert fitting so that the ring gasket 8' will uniformly compress within the insert fitting 2' when the valve is closed.

Threaded at 10' into the gasket ring 6' is a threaded gear segment carrying member 11', and formed integral therewith is the gear segment 12' preferably of the worm engaging type, this segment is rocked by means of a worm 13' in the modified form shown in Figure 7 where the operating shaft 14' on which the worm is mounted is radially disposed and in the plane of the gear segment. Worm shaft 14' is radially disposed and is rotatably mounted in a bearing 15' and terminates in a hand wheel 16', so that the operator may operate and regulate the valve. It will be noted that when the disc valve is in closed position that the pressure will be equally distributed thereon so there is a positive holding of the valve in closed position with no tendency towards opening.

Extending downwardly and outwardly from the inner periphery of the valve carrying member 3' are spaced integral valve supporting arms 17' and the ends of these arms terminate in recesses 18' in the disc valve member 11'. The ends of pin 9' have bearings in these arms so the disc valve can easily tilt from closed to open positions as desired. It will be noted that the valve is offset to one side of the member 3' so it can operate in the insert member 2'.

The form of valve shown in Figure 5 is substantially the same as that of the other form set forth above, with the exception that the operating shaft 19' is transversely disposed and carries a gear 20', which meshes with the gear segment 12', hence the relationship of all the numerals as applied to both forms with the above exception is apparent.

From the above it will be seen that a disc, or butterfly valve is provided for pipe lines, wherein the expensive machined parts are eliminated thereby allowing these large valves to be cheaply manufactured and sold. It will also be seen that the valve can be easily applied to pipe lines by simply placing an insert in the pipe line.

This application is a continuation in part of my prior applications Serial Numbers 365,384 and 365,385 filed July 1, 1953, both of which have since been abandoned.

Having thus described my invention, I claim:

1. A valve insert for pipe lines comprising an annular insert casing for attachment to an adjoining pipe line section, brackets formed integral with the inner periphery of said casing and projecting beyond the end of said casing in parallel relation to the longitudinal axis thereof, a transversely disposed disk valve rockably mounted on the projecting ends of said brackets beyond the end of said casing for insertion within the adjoining pipe line section, and means mounted in said casing operable to rock said valve into and out-of sealing engagement with the wall of the adjoining pipe section.

2. A device as described in claim 1 wherein said means is a rock shaft mounted transversely of said casing having an arm connected by a link with said disk valve at one side thereof.

3. A valve insert for pipe lines comprising an annular insert casing for attachment to an adjoining pipe line section, spaced brackets formed integral with the inner periphery of said casing and projecting downwardly and outwardly beyond the end of said casing into the adjoin pipe line section, a disk valve having recesses in one face thereof to receive the free ends of said brackets, a pivot pin connecting said valve to the free ends of said brackets rockably mounting said valve for swinging movement, a ring gasket removably attached to the periphery of said valve for sealing engagement with the inner periphery of the adjoining pipe section and means carried by said casing for swinging said valve into and out-of sealing engagement.

4. A valve insert for pipe lines comprising an insert casing for attachment to an adjoining pipe line section, a disk valve, means carried by said casing for rockably supporting said disk valve beyond said casing and transversely within the adjoining pipe line section, and means for rocking said disk valve to swing the valve into and out-of sealing engagement with the walls of the adjoining pipe section.

5. A valve insert for pipe lines comprising an insert casing for attachment to an adjoining pipe line section, supporting arms within said casing extending outwardly and beyond the end of the casing, a transversely disposed disk valve hingedly mounted on the outer ends of said supporting arms beyond the end of said casing for insertion in the adjoining pipe section, a gear segment projecting from one face of said disk valve into said casing, and rotatable gear means carried by said casing cooperating with said gear segment to swing said valve disk into and out-of sealing engagement with the wall of the adjoining pipe section.

6. A valve insert for pipe lines comprising an annular insert casing for attachment to an adjoining pipe line section, supporting arms extending from the inner periphery of said casing outwardly beyond the end of the casing, a disk valve having recesses in one face to receive the free ends of said arms, a pivot pin hingdly mounting said disk valve on said arms beyond the end of said casing for insertion in the adjoining pipe line section, a gear segment extending across the face of said disk valve and extending into the insert casing, and rotatable gear means carried by said casing cooperating with said gear segment to swing said disk valve into and out-of sealing engagement with the wall of the adjoining pipe line section.

7. A valve insert for pipe lines comprising an insert casing for attachment to an adjoining pipe line section, a disk valve, means carried by said casing pivotally supporting said disk valve in spaced relation to one end of said casing and in alinement therewith for insertion in the adjoining pipe line section, a gear segment projecting from the face of said disk valve and extending into said casing, and means carried by said casing for moving said gear segment to swing said disk valve into and out-of sealing engagement with the wall of the adjoining pipe section.

References Cited in the file of this patent

UNITED STATES PATENTS

| 18,912 | Ketcham | Dec. 22, 1857 |
| 425,108 | Richardson | Apr. 8, 1890 |
| 1,233,654 | Dziatkiewicz | July 17, 1917 |
| 1,441,317 | Walsh | Jan. 9, 1923 |
| 1,682,075 | Foulds | Aug. 28, 1928 |
| 2,218,682 | Medson | Oct. 22, 1940 |

FOREIGN PATENTS

| 482 | Great Britain | 1863 |
| 418,003 | Great Britain | 1934 |